Oct. 2, 1928.
A. A. CRIPPS
1,686,126
REAR CURTAIN LIGHT SUPPORT
Filed Oct. 24, 1923
2 Sheets-Sheet 1
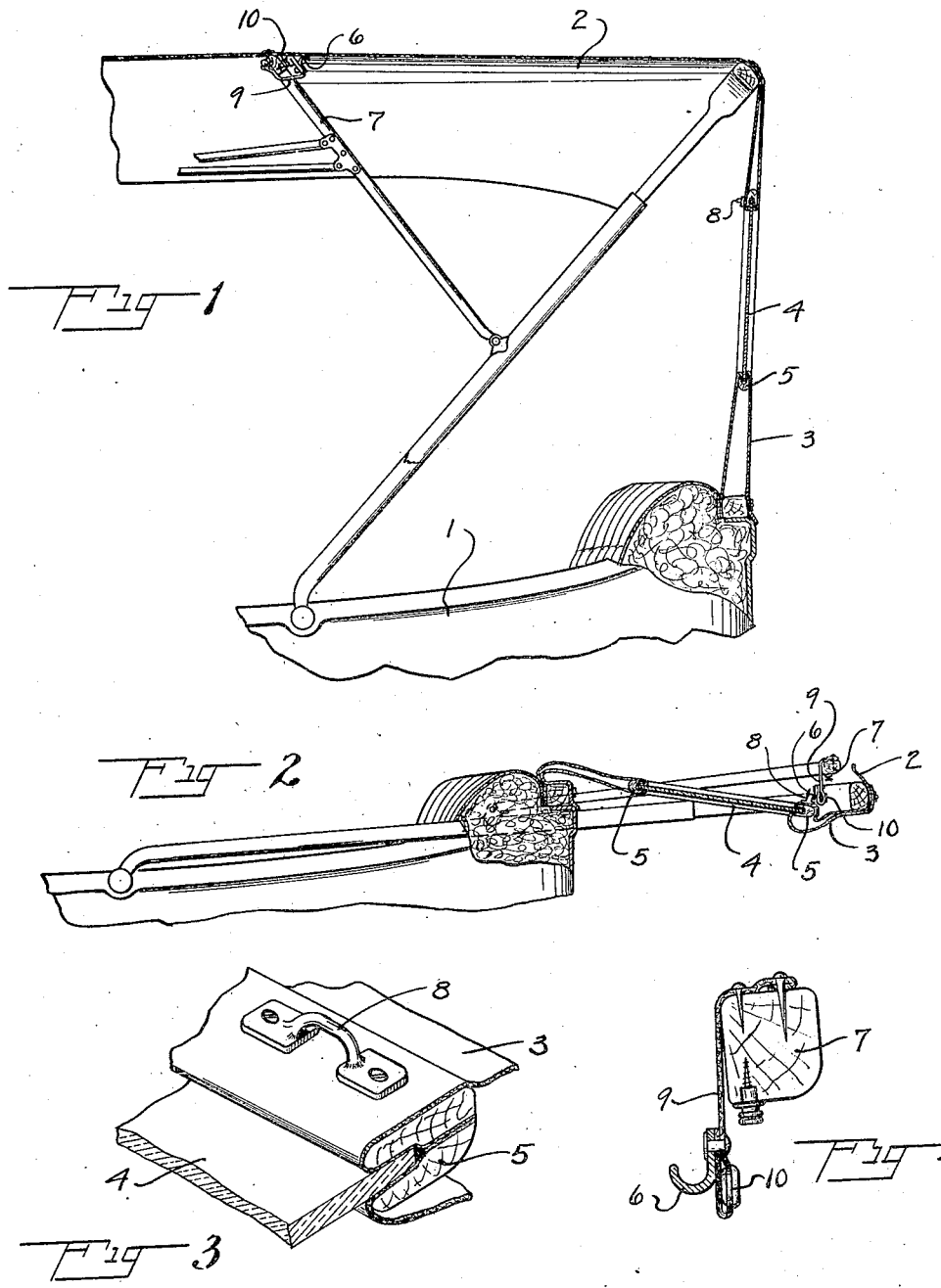
INVENTOR
Albert A. Cripps
BY
Newell and Spencer
ATTORNEYS Oct. 2, 1928.
A. A. CRIPPS
1,686,126
REAR CURTAIN LIGHT SUPPORT
Filed Oct. 24, 1923
2 Sheets-Sheet 2
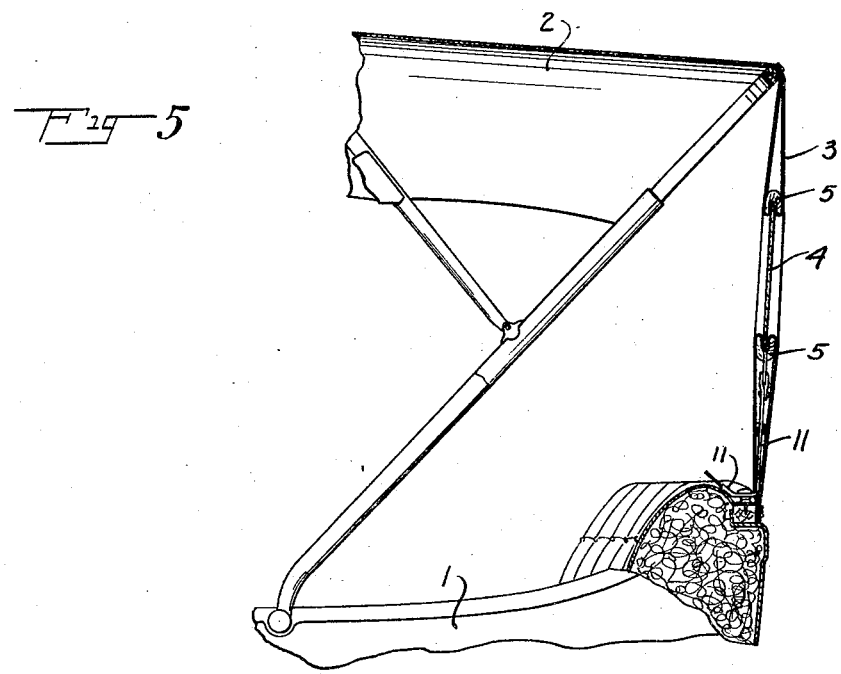
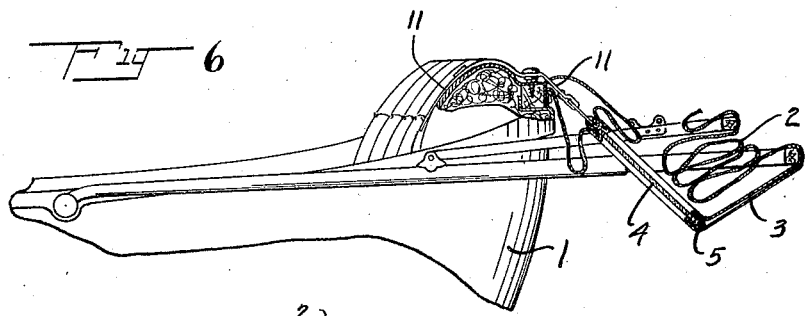
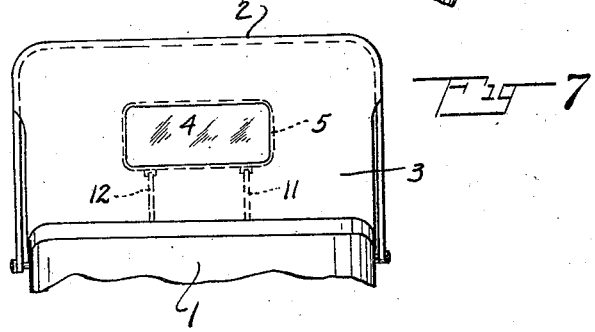
INVENTOR
Albert A. Cripps.
BY
Newell and Spencer.
ATTORNEYS Patented Oct. 2, 1928.

1,686,126

UNITED STATES PATENT OFFICE.

ALBERT A. CRIPPS, OF DETROIT, MICHIGAN, ASSIGNOR, BY MESNE ASSIGNMENTS, TO DODGE BROTHERS INC., A CORPORATION OF MARYLAND.

REAR-CURTAIN-LIGHT SUPPORT.

Application filed October 24, 1923. Serial No. 670,410.

This invention relates to a rear curtain light support, and more particularly to a means for fastening the rear curtain light or glass in an automobile top when the top is down or in collapsed position so as to prevent sagging of the glass and to obviate the possibility of breakage thereof.

It is well known that breakage of glass in the rear curtain of an automobile top frequently occurs, due to sagging of the curtain and the knocking of the glass against the spare tire or spare tire support. It is the object of the present invention to provide a means whereby the rear curtain light of an automobile may be fastened or held in position when the top is lowered so as to prevent sagging and knocking against other parts of the machine when the automobile is in motion, so as to prevent breakage of the glass. By suitable means for this purpose a saving in upkeep may be effected and the annoyance and loss of time incident to breakage of the rear curtain light or lights may be avoided. In the drawings, which illustrate the preferred embodiment of the invention, Fig. 1 is an elevational view of a portion of a car body and top therefor in raised position showing the preferred form of fastening means for the rear curtain light;

Fig. 2 is a view similar to Fig 1, but with the top in lowered position, showing the manner of attaching the rear curtain light to the fastening means;

Fig. 3 is a detail view of a portion of the rear curtain light and frame therefor, showing a form of loop adapted to be attached to the frame, by means of which the light may be rigidly held in position when the top is down;

Fig. 4 is a detail view of the hook adapted to engage the loop shown in Fig. 3 and means for fastening the hook when not in use so as to prevent swinging;

Fig. 5 is an elevational view of a portion of the body of a car with its top in raised position, showing a modified means for fastening the light or glass when the top is in lowered position;

Fig. 6 is a view similar to Fig. 2 in which the modified fastening means is shown in engaged position for rigidly holding the curtain light; and Fig. 7 is a view from the rear of a portion of the car body and a top attached thereto, the positions of the fastening straps comprising the modified form of the fastening means being indicated by dash lines.

Referring in detail to the drawings, 1 indicates a portion of a car body with a top 2, and rear curtain 3 in which is a rear curtain light 4 of transparent material, preferably glass, which is held in position therein in the usual manner by means of a frame 5. Means are provided for rigidly holding the rear curtain light or glass against movement during the operation of the machine, which, in the preferred embodimnt of the invention, includes a hook member 6, which is preferably fastened to one of the bows 7 or supporting parts for the top, and a loop 8 adapted to engage the hook, which is preferably of the form known as a footman loop, which may be readily attached to the holding frame 5. The hook member is preferably attached to the third top bow, or in other words, the second bow from the rear, by means of a strap 9 which may be readily attached thereto. In order to provide means for holding the strap when not in use, when the top is in raised position, the hook and strap may be fastened neatly against the rear side of the bow by means of a glove fastener 10 so as not to hang down or to swing when the car is in motion. When the top is lowered, the glove fastener is released and the strap then hangs down in such a position that the hook may be engaged with the loop which is fastened to the upper part of the light frame. By this means the rear curtain is prevented from sagging and the light is rigidly held in such a position that all danger of breakage is avoided.

It is to be understood that various changes and modifications may be made in the devices which have been illustrated, without departing from the spirit and scope of the invention as defined in the claims. In place of having the hook and loop as shown, I might employ other similar fastening means, and in place of the glove fasteners upon straps, I might use other fastening means which might be attached in some other manner to hold the light so as to prevent substantial movement thereof. I desire therefore not to be limited to the specific forms of the invention illustrated.

Having thus described the invention, what is claimed as new is:

1. In a folding top, a rear curtain, a light in said curtain, and means out of operation when the top is raised and arranged to be put in operation when the top is lowered for supporting one end of the light in a position in or adjacent the plane between the points of attachment of the top and bottom edges of the rear curtain to the body and top frame respectively when the top is lowered.

2. In a folding top, a rear curtain, a light in said curtain, and means other than the curtain for supporting one end of the light against sagging and allowing the other end of said light to be supported by the curtain, said means being out of operation when the top is raised and arranged to be put in operation when the top is lowered.

3. In an automobile top, bows for holding said top, a rear curtain, a light in said curtain, a loop attached to the upper part of said light, a hook attached to one of said bows and adapted when in lowered position of the top to engage said loop whereby said light is held against relative movement during operation of the automobile.

4. In an automobile top, bows for holding said top, a rear curtain, a frame in said curtain for holding a light therein, a footman loop attached to said frame, a hook attached to one of said bows and adapted to engage said loop when said top is in lowered position so as to rigidly hold said light against movement relative to the automobile body.

5. In an automobile, a foldable top having a rear curtain, bows for holding said top, a hook attached to one of said bows, fastening means to hold said hook against movement when said top is up, a rear curtain light, and means for attaching said light to said hook to rigidly hold the light when said top is lowered.

6. In an automobile top, a rear curtain, a light in said curtain and means for fastening said light at one end, said means operating to tighten said curtain at the other end of said light when said top is in folded position.

Signed at Detroit, Mich., this 20th day of October, 1923.

ALBERT A. CRIPPS.